United States Patent
Yanagisawa et al.

(10) Patent No.: US 10,841,027 B2
(45) Date of Patent: Nov. 17, 2020

(54) BROADCAST WAVE SYNCHRONIZATION SIGNAL CONVERTING DEVICE

(71) Applicant: HITACHI KOKUSAI ELECTRIC INC., Tokyo (JP)

(72) Inventors: Koichi Yanagisawa, Tokyo (JP); Satoru Yasui, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/496,824

(22) PCT Filed: Mar. 27, 2017

(86) PCT No.: PCT/JP2017/012442
§ 371 (c)(1),
(2) Date: Sep. 23, 2019

(87) PCT Pub. No.: WO2018/179066
PCT Pub. Date: Oct. 4, 2018

(65) Prior Publication Data
US 2020/0127748 A1    Apr. 23, 2020

(51) Int. Cl.
*H04H 20/18* (2008.01)
*G01S 19/03* (2010.01)
(Continued)

(52) U.S. Cl.
CPC .......... *H04H 20/18* (2013.01); *G01S 19/03* (2013.01); *H04H 20/72* (2013.01); *H04L 7/0008* (2013.01); *H04L 7/04* (2013.01)

(58) Field of Classification Search
CPC ........ H04H 20/18; H04H 20/72; G01S 19/03; H04L 7/0008; H04L 7/04
See application file for complete search history.

(56) References Cited

U.S. PATENT DOCUMENTS 5,101,416 A * 3/1992 Fenton .................... G01S 19/21
375/150
5,768,326 A * 6/1998 Koshiro ................ H03L 7/0807
375/376
(Continued)

FOREIGN PATENT DOCUMENTS

JP    2006-345223 A    12/2006
JP    2009-33326 A    2/2009
(Continued)

OTHER PUBLICATIONS

Written Opinion of the International Searching Authority issued by the Japan Patent Office for corresponding International Patent Application No. PCT/JP2017/012442, dated Jun. 13, 2017, with an English translation.

(Continued)

*Primary Examiner* — Md K Talukder
(74) *Attorney, Agent, or Firm* — Myers Wolin, LLC

(57) ABSTRACT

A broadcast wave synchronization signal converting device that synchronizes broadcast waves with GNSS signals on a reception side and corrects the broadcast waves to global standard times by use of correction values, thereby performing periodic calibrations of frequencies. The broadcast wave synchronization signal converting device includes: a PLL circuit reproduces system clocks on the basis of time information acquired from received broadcast waves; a subtractor (C1) subtracts, from a counter value corresponding to the periodic signal intervals of GNSS signals, a counter value of the system clocks counted at the signal intervals and outputs the difference value; a control amount adjustor calculates a control amount of synchronization as a correction value on the basis of the difference value; and a subtractor (B) subtracts the correction value from the acquired time infor- (Continued)

mation and sets the corrected time information to a PCR counter as the internal time information thereof.

6 Claims, 10 Drawing Sheets

(51) Int. Cl.
*H04H 20/72* (2008.01)
*H04L 7/00* (2006.01)
*H04L 7/04* (2006.01)

(56) References Cited

U.S. PATENT DOCUMENTS

| | | | | |
|---|---|---|---|---|
| 2003/0147426 | A1* | 8/2003 | Cronin | H04L 7/0054 370/503 |
| 2006/0239383 | A1* | 10/2006 | Wang | H04L 5/023 375/324 |
| 2007/0177690 | A1* | 8/2007 | Watanabe | H04L 27/066 375/316 |
| 2009/0011722 | A1* | 1/2009 | Kleider | H04L 27/2626 455/101 |
| 2011/0085487 | A1* | 4/2011 | Song | H04H 20/30 370/312 |
| 2017/0176953 | A1* | 6/2017 | Ogawa | G04G 5/00 |
| 2018/0287688 | A1* | 10/2018 | Otsu | H04B 7/14 |

FOREIGN PATENT DOCUMENTS

| | | |
|---|---|---|
| JP | 2011-146858 A | 7/2011 |
| JP | 2012-99960 A | 5/2012 |
| JP | 2016-39514 A | 3/2016 |
| WO | 2012/132089 A1 | 10/2012 |
| WO | 2016/194518 A1 | 12/2016 |

OTHER PUBLICATIONS

International Search Report with Written Opinion of the International Searching Authority issued by the Japan Patent Office for corresponding International Patent Application No. PCT/JP2017/012442, dated Jun. 13, 2017, with an English translation.

* cited by examiner

BROADCAST WAVE SYNCHRONIZATION SIGNAL CONVERTING DEVICE

CROSS REFERENCE TO RELATED APPLICATIONS

The present disclosure is a national phase filing under 35 U.S.C. § 371 of International Patent Application No. PCT/JP2017/012442 filed on Mar. 27, 2017, the disclosures of each of which are expressly incorporated herein by reference in their entireties.

TECHNICAL FIELD

The present invention relates to a broadcast wave synchronization signal converting device for synchronization of digital terrestrial broadcasting, and particularly to a broadcast wave synchronization signal converting device for synchronization with a GNSS (Global Navigation Satellite System).

BACKGROUND ART

Conventional Art

In conventional digital terrestrial broadcasting, since time synchronization with high accuracy is required, a broadcast station-side device may use a GPS (Global Positioning System) signal so that a digital terrestrial signal will be operated with a synchronization signal based on the GPS signal.

However, digital terrestrial broadcasting is not defined to be synchronous with a GNSS signal. In other words, broadcast wave synchronization systems for conventional digital terrestrial broadcasting are all based on subordinate synchronization, where a receiver is subordinate to a signal from a broadcast station to perform synchronization processing.

Although independent synchronization is ideal in nature and synchronization with a GPS signal individually is an ideal environment to enable processing for smooth synchronization with other systems, there are broadcast stations at which master clocks are operated to run free or in a long calibration cycle without performing periodic calibration of the master clocks in actuality.

However, since synchronization as broadcast systems can guarantee the frequency error, there is no problem even with subordinate synchronization.

Further, in the digital terrestrial broadcasting, time synchronization is performed by a PCR (Program Clock Reference) signal as time information of a broadcast wave signal to be synchronized with an upper station with an accuracy (jitter) of 500 ns or less by using a synchronous counter or the like for data reproduction. However, since it is not defined where the counter starts, the upper station cannot transmit, as a system, information time-synchronized with the GNSS signal.

Note that there is a method of performing time synchronization using a format such as ToD (Time-of-Day) or TOT (Time Offset Table), but each cycle of the time synchronization is 500 ms, which is very slow.

Further, in satellite broadcasting, since synchronization between a broadcasting satellite and a ground station is required, a Rb (rubidium) oscillator or a Cs (cesium) oscillator with high frequency accuracy is used to establish synchronization of broadcast transmission signals with a high degree of precision.

A broadcast station transmitter using the Rb oscillator maintains a frequency accuracy with sufficient margin as a transmission system of the broadcast station, but there is such a broadcast station that does not perform periodic calibration in actuality or operates in a long calibration cycle such as one year.

Given that UTC (Coordinated Universal Time) synchronization on the order of μ (micro) seconds or n (nano) seconds is maintained, calibration must always be performed or calibration must be performed within a short period (for example, during a whole day and night).

Related Art

As related prior art techniques, there are "SYNCHRONIZATION SIGNAL CONVERSION DEVICE," PCT International Publication No. WO2016/194518A1 (Hitachi Int Electric Inc.) [Patent Document 1], "SYNCHRONIZATION SIGNAL CONVERTER," Japanese Patent Application Laid-Open No. 2016-039514 (Hitachi Int Electric Inc.; KDDI Corp.) [Patent Document 2], "SYNCHRONIZING SIGNAL GENERATOR AND BASE STATION DEVICE," Japanese Patent Application Laid-Open No. 2011-146858 (Kyocera Corp.) [Patent Document 3], and "SYNCHRONIZATION DEVICE AND SYNCHRONIZATION METHOD," PCT International Publication No. WO2012/132089A1 (NEC Corp.) [Patent Document 4].

In Patent Document 1, there is disclosed a technique for acquiring a broadcast wave synchronization signal from broadcast waves at a base station even in such an environment that a GNSS signal or a network signal cannot be received and converting the broadcast wave synchronization signal to a synchronization signal of a pseudo GNSS signal or a pseudo network signal to enable the reproduction of a reference clock.

In Patent Document 2, there is disclosed a technique for acquiring a broadcast wave synchronization signal from broadcast waves at a base station even in such an environment that a GPS signal or a network signal cannot be received and converting the broadcast wave synchronization signal to a synchronization signal of a pseudo GPS signal or a pseudo network signal to enable the reproduction of a reference clock.

In Patent Documents 3 and 4, there are disclosed techniques for obtaining a synchronization signal when the synchronization signal cannot be obtained from a GPS signal or the like.

CITATION LIST

Patent Documents

Patent Document 1: PCT International Publication No. WO2016/194518A1
Patent Document 2: Japanese Patent Application Laid-Open No. 2016-039514
Patent Document 3: Japanese Patent Application Laid-Open No. 2011-146858
Patent Document 4: PCT International Publication No. WO2012/132089A1

SUMMARY OF THE INVENTION

Problems to be Solved by the Invention

However, in the conventional digital terrestrial broadcasting, since the configuration is not to be always synchronized with the GNSS signal, there is a problem that processing for synchronization with other systems cannot be performed smoothly.

Further, in the conventional digital terrestrial broadcasting, since there is no basis for time synchronization with a high accuracy of a second or less, there is another problem that the upper station cannot transmit, as a system, information time-synchronized with the GNSS signal.

Further, in the conventional digital terrestrial broadcasting, since each cycle of periodic calibration is relatively long, there is still another problem that the frequency deviation becomes so large that times may be largely out of synchronization to disable synchronization with the UTC time.

Note that Patent Documents 1 to 4 do not mention such a configuration that broadcast waves are synchronized with the GNSS signal to make a correction to fit the UTC world standard time by a correction value in order to perform periodic calibration of the frequency.

The present invention has been made in view of the above circumstances, and it is an object thereof to provide a broadcast wave synchronization signal converting device configured to synchronize broadcast waves with a GNSS signal on a receiver side and make a correction to fit the UTC world standard time by a correction value to perform periodic calibration of the frequency.

Means for Solving the Problems

The present invention to solve the problems in the above conventional examples provides a broadcast wave synchronization signal converting device configured to synchronize time information, acquired from received broadcast waves, with a GNSS signal and set the synchronized time information to internal time information, including: a phase synchronization unit configured to reproduce a system clock based on the acquired time information; and a synchronization correction unit configured to correct the acquired time information to be synchronized with the GNSS signal, wherein the synchronization correction unit has: a subtractor which subtracts, from a counter value corresponding to a periodic signal interval of the GNSS signal, a counter value of the system clock counted in the signal interval and outputs a difference value; a control amount adjustor which calculates, as a correction value, the control amount of synchronization based on the difference value; and a setting unit which subtracts the correction value from the acquired time information and sets the corrected time information to the internal time information in the phase synchronization unit.

The present invention is such that the control amount adjustor in the above broadcast wave synchronization signal converting device calculates correction values for a plurality of channels, creates a list in which information on the channels is associated with the correction values, and selects a channel small in correction value from the list.

The present invention is such that, when a difference value between the acquired time information and the internal time information falls out of a specific range, the phase synchronization unit in the above broadcast wave synchronization signal converting device invalidates and masks the difference value.

The present invention is such that the synchronization correction unit in the above broadcast wave synchronization signal converting device further has: an edge detection unit which detects a 1PPS edge of a GPS signal; a first frequency divider which frequency-divides a reproduction clock of the GPS signal; a second frequency divider which frequency-divides the system clock; a first counter which counts a clock from the first frequency divider and outputs, to the subtractor, a counter value by using an edge detection signal from the edge detector; and a second counter which counts a clock from the second frequency divider and outputs, to the subtractor, a counter value by using the edge detection signal from the edge detector, wherein the clock output from the first frequency divider is the same in frequency as the clock output from the second frequency divider.

The present invention is such that the synchronization correction unit in the above broadcast wave synchronization signal converting device further has: an edge detection unit which detects a 1PPS edge of a GPS signal; and a counter which counts the system clock and outputs, to the subtractor, a counter value by using an edge detection signal from the edge detector, wherein the subtractor receives input of the edge detection signal from the edge detection unit and holds a counter value in an interval of 1PPS of the GPS signal, and subtracts the counter value of the counter from the held counter value and outputs a difference value by using the edge detection signal.

Advantageous Effect of the Invention

According to the present invention, the broadcast wave synchronization signal converting device is configured such that the phase synchronization unit reproduces a system clock based on time information acquired from received broadcast waves, and the synchronization correction unit corrects the acquired time information to be synchronized with a GNSS signal, wherein the synchronization correction unit has: the subtractor which subtracts, from a counter value corresponding to a periodic signal interval of the GNSS signal, a counter value of the system clock counted in the signal interval and outputs a difference value; the control amount adjustor which calculates, as a correction value, the control amount of synchronization based on the difference value; and the setting unit which subtracts the correction value from the acquired time information and sets the corrected time information to internal time information in the phase synchronization unit. Thus, the broadcast wave synchronization signal converting device has the effect of synchronizing the broadcast waves with the GNSS signal on the reception side, and making a correction to fit a world standard time by the correction value to enable periodic calibration of the frequency.

MODE FOR CARRYING OUT THE INVENTION

An embodiment of the present invention will be described with reference to the accompanying drawings.

Outline of Embodiment

A broadcast wave synchronization signal converting device according to the embodiment of the present invention is configured to include: a phase synchronization unit that reproduces a system clock based on time information acquired from received broadcast waves; and a synchronization correction unit that makes a correction to synchronize the acquired time information with a GNSS signal, wherein the synchronization correction unit has: a subtractor which subtracts, from a counter value corresponding to a periodic signal interval of the GNSS signal, a counter value of the system clock counted in the signal interval to output a difference value; a control amount adjustor which calculates, as a correction value, the control amount of synchronization based on the difference value; and a setting unit which subtracts the correction value from the acquired time information to set corrected time information to internal time information in the phase synchronization unit, whereby broadcast waves are synchronized with the GNSS signal on a reception side and corrected by the correction value into a world standard time to enable periodic calibration of the frequency.

Figure 1:
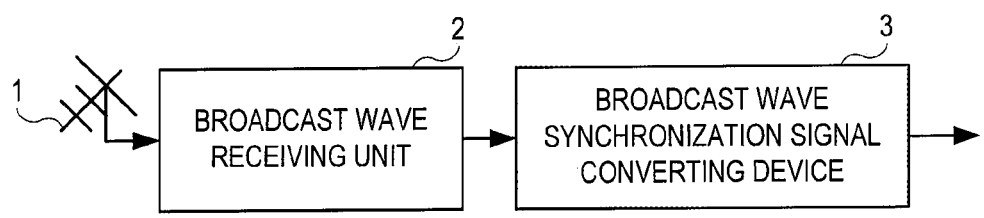
FIG. 1 is a schematic configuration diagram of a broadcast wave receiving system.

[Broadcast Wave Receiving System: FIG. 1]

A broadcast wave receiving system according to the embodiment of the present invention will be described with reference to FIG. 1. FIG. 1 is a schematic configuration diagram of the broadcast wave receiving system.

As illustrated in FIG. 1, the broadcast wave receiving system basically includes a broadcast wave antenna 1, a broadcast wave receiving unit 2, and a broadcast wave synchronization signal converting device 3.

The broadcast wave antenna 1 is an antenna for capturing broadcast waves.

The broadcast wave receiving unit 2 is a digital terrestrial broadcasting tuner unit in which, when a television channel is changed from the outside, a channel search is made to set a channel.

The present invention features that the broadcast wave synchronization signal converting device 3 synchronizes broadcast wave time information with a GNSS signal to make a correction to fit a UTC (world standard time) by a correction value in order to perform periodic calibration of the frequency.

Figure 2:
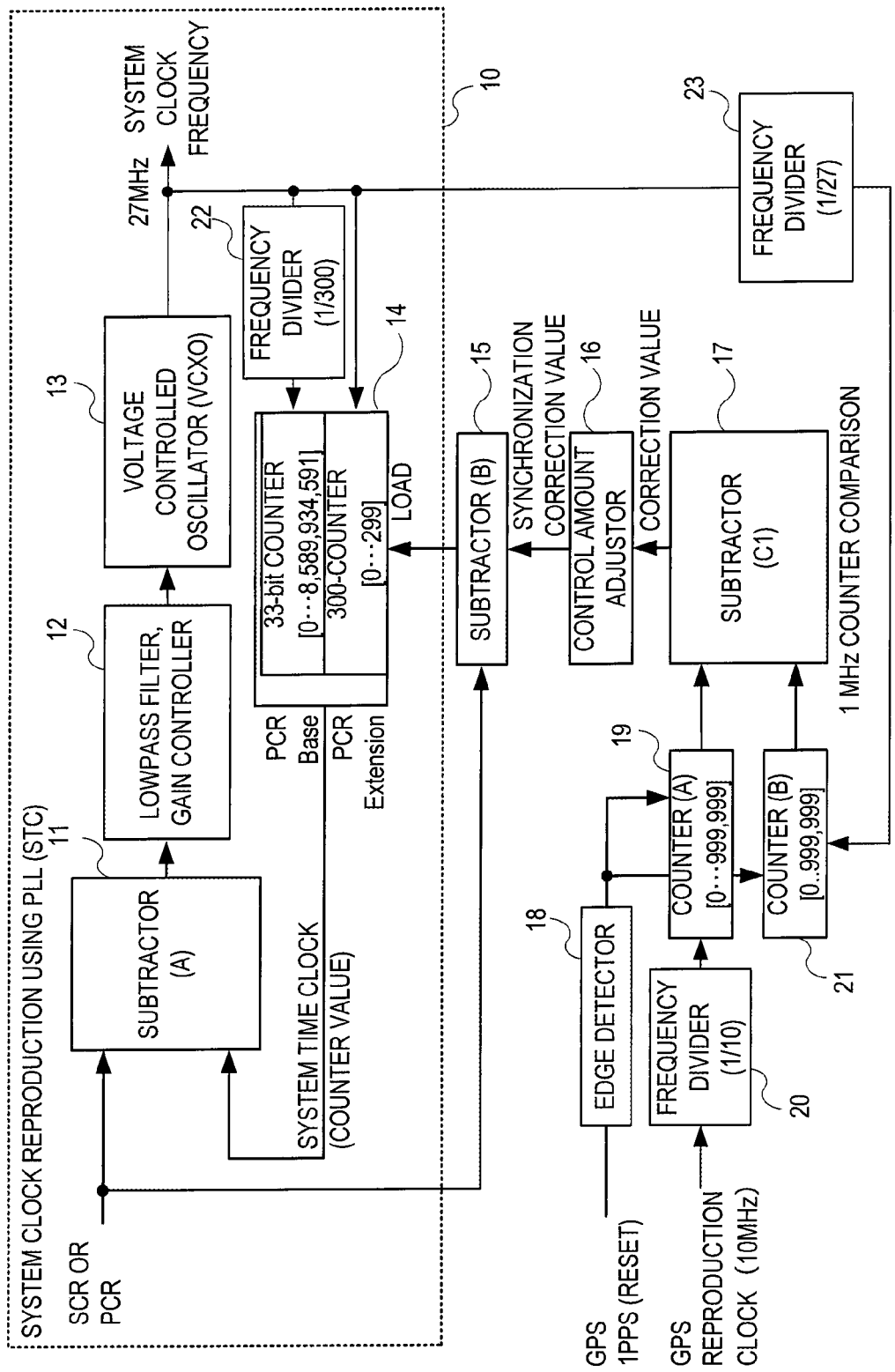
FIG. 2 is a configuration block diagram of a first conversion device.

[First Conversion Device: FIG. 2]

A broadcast wave synchronization signal converting device (first conversion device) according to the embodiment of the present invention will be described with reference to FIG. 2. FIG. 2 is a configuration block diagram of a first conversion device.

As illustrated in FIG. 2, the first conversion device basically has a PLL (Phase Locked Loop) circuit (phase synchronization circuit/phase synchronization unit) 10, and a plurality of circuits (synchronization correction circuit/synchronization correction unit) that synchronizes the system clock with a GPS signal as a GNSS signal to make a correction.

[Each Unit of First Conversion Device]

In the first conversion device, the PLL circuit 10 includes a subtractor (A) 11, a lowpass filter, gain controller 12, a voltage controlled oscillator (VCXO: Voltage Controlled Crystal Oscillator) 13, a PCR counter 14, and a frequency divider 22.

[Subtractor (A) 11]

The subtractor (A) 11 receives input of the counter value of an SCR (System Clock Reference) signal or a PCR signal as time information obtained at the broadcast wave receiving unit 2, receives input of a system time clock (counter value) from the PCR counter 14, and outputs the value of a difference between both counter values (a difference value) to the lowpass filter, gain controller 12.

Since signal variations occur in broadcast waves depending on the propagation situation, continuous synchronization corrections are so performed that the difference value will become zero "0" in the first conversion device.

[Lowpass Filter, Gain Controller 12]

The lowpass filter, gain controller 12 averages DC signals of the output signals of difference values from the subtractor (A) 11, and converts an averaged DC signal to a DC signal with less AC component to perform gain control.

Further, the lowpass filter, gain controller 12 has a function of determining whether the output of the difference value from the subtractor (A) 11 falls within an effective range, and masking (invalidating) the signal when it is out of the effective range.

Further, the lowpass filter, gain controller 12 has a clock function of measuring time to measure the time for which a broadcast station has been out of the effective range. When the time for which the broadcast station has been out of the effective range is longer than a specific time, synchronization correction on the channel is stopped and the synchronization correction is performed on another channel smaller in synchronization correction value to be described later.

[Voltage Controlled Oscillator 13]

The voltage controlled oscillator 13 oscillates according to voltage input from the lowpass filter, gain controller 12 to output a system clock frequency. For example, since video signals of MPEG (Moving Picture Experts Group) are handled in the broadcast wave receiving system, a system clock frequency of 27 MHz is output.

[PCR Counter 14]

The PCR counter 14 is configured to include a PCR base 33-bit counter and a PCR extension 300-counter.

The 33-bit counter is an upper counter operating at 90 kHz (27 MHz/300), and the 300-counter is a 9-bit lower counter operating at 27 MHz.

Thus, the 33-bit counter counts up at 90 kHz and the 300-counter counts up at 27 MHz.

Then, the 300-counter is a continuity counter operating at a clock frequency of 27 MHz to count from 0 to 299, and at the point when the count value becomes 299, the 33-bit counter is counted up by one and the 300-counter returns to zero.

Thus, the PCR counter 14 outputs, to the subtractor (A) 11, a PCR count value of 42 bits together at 27 MHz. This count value becomes a value as the system clock.

In other words, the initial value of the counter is such that the time information is set in the 33-bit counter and the 300-counter at the timing of detecting the PCR signal or the like, and then counted up at clock frequencies of 90 kHz and 27 MHz, respectively.

Here, as a feature of the present invention, the value (counter value) of time information (system time clock), in which the synchronization difference value with the GPS signal from the subtractor (B) 15 is corrected, is loaded into the 33-bit counter and the 300-counter at the timing of detecting the PCR signal or the like.

Therefore, the PCR counter 14 outputs, to the subtractor (A) 11, the system time clock (counter value) synchronized with the GPS signal.

The count value of the PCR counter 14 is usually used as the system time (STC: System Time Clock).

[Frequency Divider 22]

The frequency divider 22 receives input of the system clock frequency from the voltage controlled oscillator 13, divides the frequency by $1/300$, and outputs it to the 33-bit counter.

Since the system clock frequency of 27 MHz is divided by $1/300$, a clock of 90 kHz is generated to operate the 33-bit counter at this clock frequency.

[Each Unit of Circuit for Synchronization]

Next, the plurality of circuits for synchronizing the system clock with a GPS signal as a GNSS signal to correct the system clock will be described.

As these circuits, the subtractor (B) 15, a control amount adjustor 16, a subtractor (C1) 17, an edge detector 18, a counter (A) 19, a frequency divider 20, a counter (B) 21, and a frequency divider 23 are included.

[Edge Detector 18]

The edge detector 18 receives input of a 1PPS (Pulse Per Second: a pulse generated once a second) signal of the GPS signal, detects the edge of the pulse, and outputs it to the counter (A) 19 and the counter (B) 21 as a reset signal.

[Frequency Divider 20]

The frequency divider 20 receives input of a GPS reproduction clock of 10 MHz, frequency-divides the clock by $1/10$, and outputs a clock of 1 MHz to the counter (A) 19. The frequency divider 20 corresponds to a first frequency divider in the appended claims.

[Frequency Divider 23]

The frequency divider 23 receives input of a system clock frequency of 27 MHz, divides the system clock frequency by $1/27$, and outputs a clock of 1 MHz to the counter (B) 21. The frequency divider 23 corresponds to a second frequency divider in the appended claims.

[Counter (A) 19]

The counter (A) 19 receives input of the $1/10$-divided clock of the GPS reproduction clock from the frequency divider 20, counts the clock, and outputs, to the subtractor (C1) 17, the counter value and resets the counter value by the reset signal from the edge detector 18. The counter (A) 19 corresponds to a first counter in the appended claims.

[Counter (B) 21]

The counter (B) 21 receives input of the $1/27$-divided clock of the system clock from the frequency divider 23, counts the clock, and outputs, to the subtractor (C1) 17, the counter value and resets the counter value by the reset signal from the edge detector 18. The counter (B) 21 corresponds to a second counter in the appended claims.

[Subtractor (C1) 17]

The subtractor (C1) 17 receives input of the counter value from the counter (A) 19 and the counter value from the counter (B) 21, compares both of the counter values, and outputs a difference value to the control amount adjustor 16 as a correction value.

Specifically, the counter value from the counter (B) 21 is subtracted from the counter value from the counter (A) 19, and a value of the difference is output to the control amount adjustor 16 as a correction value.

The correction value will be described. When counter values indicative of the times of clocks ("GPS clocks" here) from the counter (A) 19 based on the GPS reproduction clock are denoted by T0, T1, T2, T3, T4, . . . , and counter values indicative of the times of clocks ("PCR clocks" here) from the counter (B) 21 based on the system clock are denoted by m0, m1, m2, m3, m4, . . . , the following slopes are calculated as correction values.

Slope 1=$(T1-T0)/(m1-m0)$

Slope 2=$(T2-T1)/(m2-m1)$

Slope 3=$(T3-T2)/(m3-m2)$

Slope 4=$(T4-T3)/(m4-m3)$

[Control Amount Adjustor 16]

In the broadcast wave receiving system, since the optimum channel is selected from among multiple channels, channel search is made in the broadcast wave receiving unit 2.

Then, the control amount adjustor 16 of the first conversion device includes a memory that receives input of information (channel No. or the like) on a broadcast station selected by the channel search in the broadcast wave receiving unit 2, accumulates correction values (the values of slopes 1, 2, 3, 4, . . . ) from the subtractor (C1) 17, and stores an average of the correction values (an average of the values of slopes) in association with the channel No. or the like.

The average of the correction values is the synchronization difference value with the GPS clock. Here, the average of the correction values is set as the "synchronization correction value."

Further, the control amount adjustor 16 includes a selector that selects a broadcast station small in synchronization correction value from broadcast station information and a list of synchronization correction values stored in the memory upon selection of a broadcast station, and outputs information on the broadcast station to the broadcast wave receiving unit 2.

A plurality of broadcast stations to be selected may be selected in ascending order of synchronization correction values.

[Subtractor (B) 15]

The subtractor (B) 15 receives input of an SCR signal or a PCR signal, receives input of the synchronization correction value from the control amount adjustor 16, subtracts the synchronization correction value from the SCR signal or the PCR signal, and outputs (loads) the subtraction result (corrected system time clock) to the PCR counter 14.

The system clock correction value is set in the 33-bit counter and the 300-counter.

The subtractor (B) 15 corresponds to a setting unit in the appended claims.

[Operation of First Conversion Device]

The operation of the first conversion device will be described.

The subtractor (A) 11 calculates a difference between time information (counter value) of the SCR signal or the PCR signal and the corrected system time clock (counter value) from the PCR counter 14, and outputs the difference value to the lowpass filter, gain controller 12.

The lowpass filter, gain controller 12 extracts a DC component of the difference value to control gain, outputs it to the voltage controlled oscillator 13 to cause the voltage controlled oscillator 13 to perform oscillation operation, and controls the oscillation frequency to output the system clock.

The system clock is divided by $1/27$ by the frequency divider 23, and a clock of 1 MHz is output to the counter (B) 21. The counter (B) 21 counts the clock.

Further, the GPS reproduction clock is divided by $1/10$ by the frequency divider 20, and a clock of 1 MHz is output to the counter (A) 19. The counter (A) 19 counts the clock.

The counter (A) 19 and the counter (B) 21 are reset by a 1PPS signal of the GPS signal from the edge detector 18 to output the counter values of respective 1 MHz clocks (GPS clock and PCR clock) to the subtractor (C1) 17.

The subtractor (C1) 17 compares the counter value of the GPS clock and the counter value of the PCR clock, and outputs a difference value to the control amount adjustor 16 as a correction value.

The control amount adjustor 16 averages correction values and outputs a synchronization correction value to the subtractor (B) 15.

The control amount adjustor 16 also generates and stores broadcast station Nos. and a list of synchronization correction values, and selects a broadcast station small in synchronization correction value using the list upon selection of a broadcast station.

The subtractor (B) 15 subtracts the synchronization correction value from the counter value in time information of the input SCR signal or the PCR signal so that the value (the counter value of the corrected system time clock) is loaded and set in the PCR counter 14.

The 33-bit counter of the PCR counter 14 operates at a system clock frequency $\frac{1}{300}$ divided by the frequency divider 22, and the 300-counter operates at the system clock frequency.

The PCR counter 14 sets, in the 33-bit counter and the 300-counter, the counter value of the corrected system time clock from the subtractor (B) 15, and counts based on the counter value, and outputs the counter value of the system time clock to the subtractor (A) 11.

Thus, since the system clock can be provided to the subtractor (A) 11 based on the counter value of the system time clock corrected to be synchronized with the GPS signal set from the subtractor (B) 15, the system clock frequency synchronized with the GPS signal can be output from the voltage controlled oscillator 13 to the outside.

Figure 3:
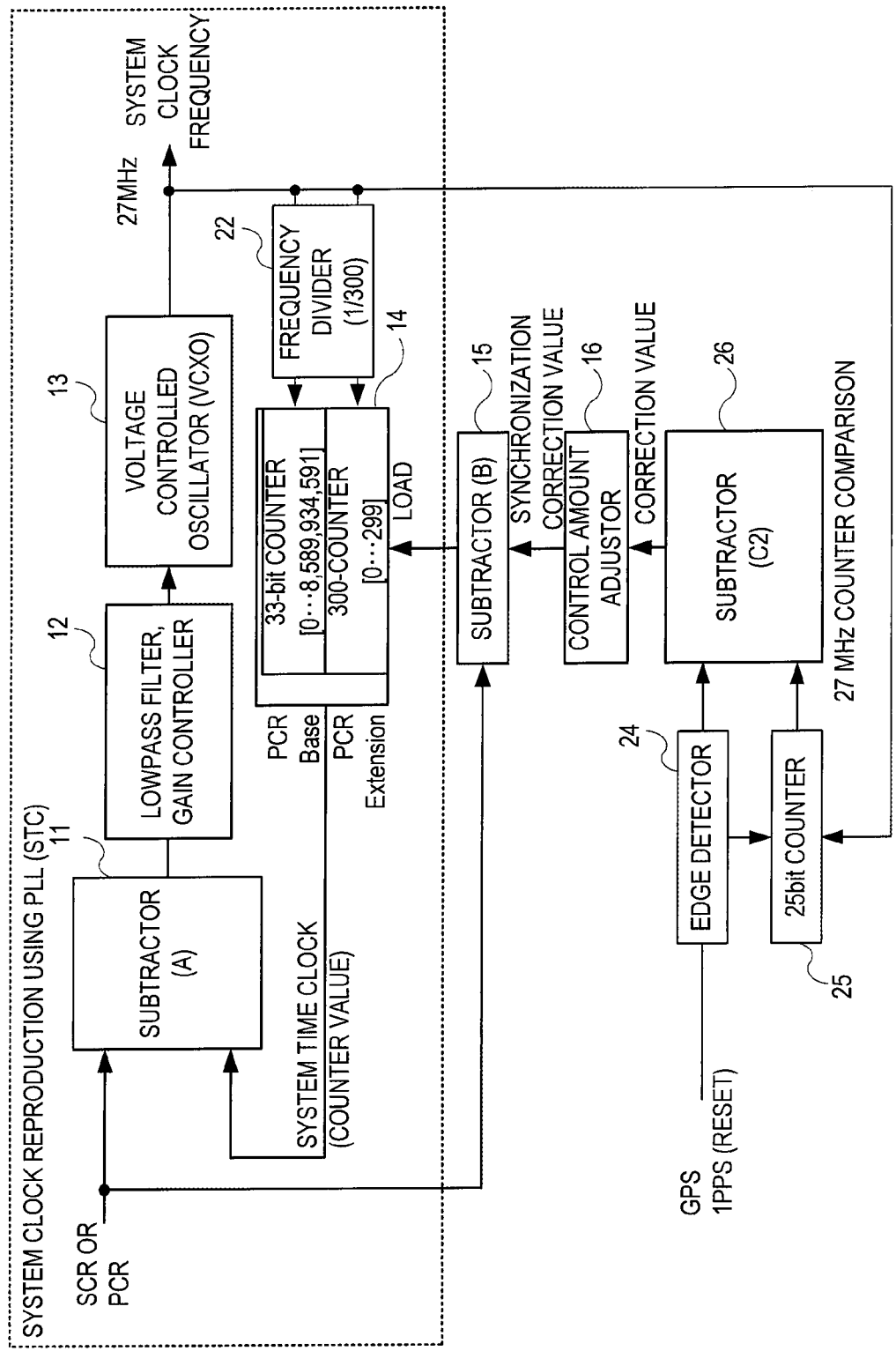
FIG. 3 is a configuration block diagram of a second conversion device.

[Second Conversion Device: FIG. 3]

Next, a second broadcast wave synchronization signal converting device (second conversion device) according to the embodiment of the present invention will be described with reference to FIG. 3. FIG. 3 is a configuration block diagram of the second conversion device.

As illustrated in FIG. 3, since the second conversion device is basically the same as the device in FIG. 2, different components will be described below.

A section in the second conversion device different from that in the first conversion device is a circuit section for performing synchronization correction. In the first conversion device, 1PPS of the GPS signal and the 10 MHz clock are used, but in the second conversion device, synchronization correction is performed by using 1PPS as a trigger without using the 10 MHz clock.

As components, an edge detector 24, a 25-bit counter 25, and a subtractor (C2) 26 are different.

The edge detector 24 is the same as that in the first conversion device in terms of the function, but different in that, when the 1PPS edge of the GPS signal is detected, the detection signal is output to the subtractor (C2) 26 and the 25-bit counter 25. In other words, the edge detection signal is output to the subtractor (C2) 26 and the 25-bit counter 25 at one second intervals.

The 25-bit counter 25 receives input of a 27 MHz system clock, and outputs the counter value to the subtractor (C2) 26 using the edge detection signal as a trigger.

When the edge detection signal is input from the edge detector 24, the subtractor (C2) 26 compares internally held 27 million counter values with count values from the 25-bit counter 25, and outputs difference values to the control amount adjustor 16 as correction values.

Specifically, the subtractor (C2) 26 performs subtraction processing for determining a difference by using the fact that the number of counts is 27 million counts in an interval (one second) from one 1PPS edge to the next 1PPS edge.

Figure 4:
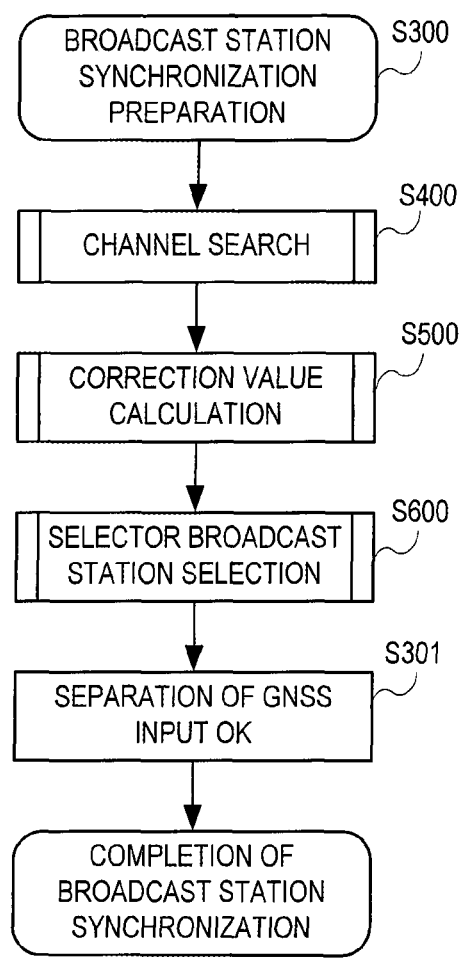
FIG. 4 is a flowchart illustrating processing for broadcast station synchronization preparation.

[Processing for Broadcast station Synchronization Preparation in Broadcast Wave Receiving System: FIG. 4]

Next, processing for broadcast station synchronization preparation in the broadcast wave receiving system will be described with reference to FIG. 4. FIG. 4 is a flowchart illustrating processing for broadcast station synchronization preparation.

As illustrated in FIG. 4, the broadcast wave receiving system first starts preparation for broadcast station synchronization as a processing flow of performing broadcast station synchronization preparation (S300).

Specifically, generation of a reproduction clock of 10 MHz in advance from 1PPS of the GNSS signal (for example, GPS signal) and the like are prepared.

The preparation may be made by the broadcast wave receiving unit 2, or by providing another circuit to make the preparation by the circuit.

Next, the broadcast wave receiving unit 2 performs channel search (S400).

Specifically, channels having reception levels of broadcast waves equal to or larger than the value of a specific CN (Carrier to Noise: carrier power to noise level) ratio are listed.

Next, the broadcast wave synchronization signal converting device 3 performs processing for correction value calculation (S500).

Specifically, correction values of receivable broadcast stations are calculated and combinations of broadcast stations and correction values are listed.

Next, the broadcast wave synchronization signal converting device 3 performs broadcast station selection processing by the selector in the control amount adjustor 16 (S600).

Specifically, broadcast stations are selected in order from the smallest in correction value from among broadcast stations listed in processing S500.

Thus, the preparation for broadcast station synchronization is completed. Although there is no need to change the input of the GNSS signal, processing for separating the input of the GNSS signal may also be performed as an option (S301).

Figure 5:
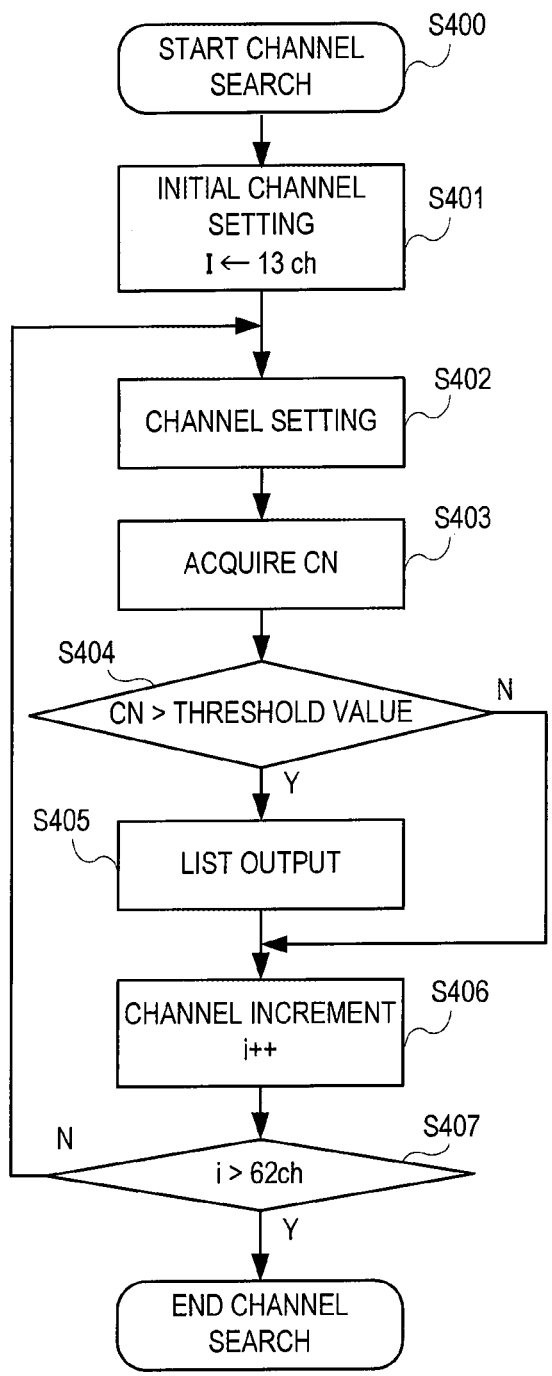
FIG. 5 is a flowchart of channel search processing.

[Channel Search Processing in Broadcast Wave Receiving Unit 2: FIG. 5]

Referring next to FIG. 5, channel search processing in the broadcast wave receiving unit 2 will next be described. FIG. 5 is a flowchart of channel search processing.

When starting channel search (S400), the broadcast wave receiving unit 2 first performs initial channel setting (S401).

Since any channel can be acquired from among 13 ch to 62 ch in the digital terrestrial broadcasting, 13 ch is set to initial value I as channel number i, and the value of the CN ratio (hereinafter called the "CN value") as the reception level of each channel is measured to perform the channel search for each channel in order up to 62 ch.

A channel setting is made (S402) to use the initial value in processing S401 or a channel incremented in processing S406 and to acquire the CN value on the channel (S403) so as to determine whether the CN value is larger than a threshold value (for example, 24 dB) (S404).

When the CN value is larger than the threshold value (in the case of Y), the channel is listed by outputting it to the list (S405) and the channel number i is incremented (S406).

When the CN value is not larger than the threshold value (in the case of N), the procedure proceeds to processing S406 without performing processing S405.

Then, it is determined whether the value of the channel number i is larger than 62 ch (S407), and when it is larger (in the case of Y), the channel search is ended. When it is not larger (in the case of N), the procedure proceeds to processing S402 to measure the CN value of the incremented channel number.

The channel search processing is to detect channels having CN values that exceed the threshold value and list the channels.

In the processing of FIG. 5, the CN values of all channels from 13 ch to 62 ch are acquired, but channel numbers to be acquired may be predetermined to measure the CN values of the channels. The method does not matter as long as plural stations (plural channels) can be acquired after all.

Figure 6:
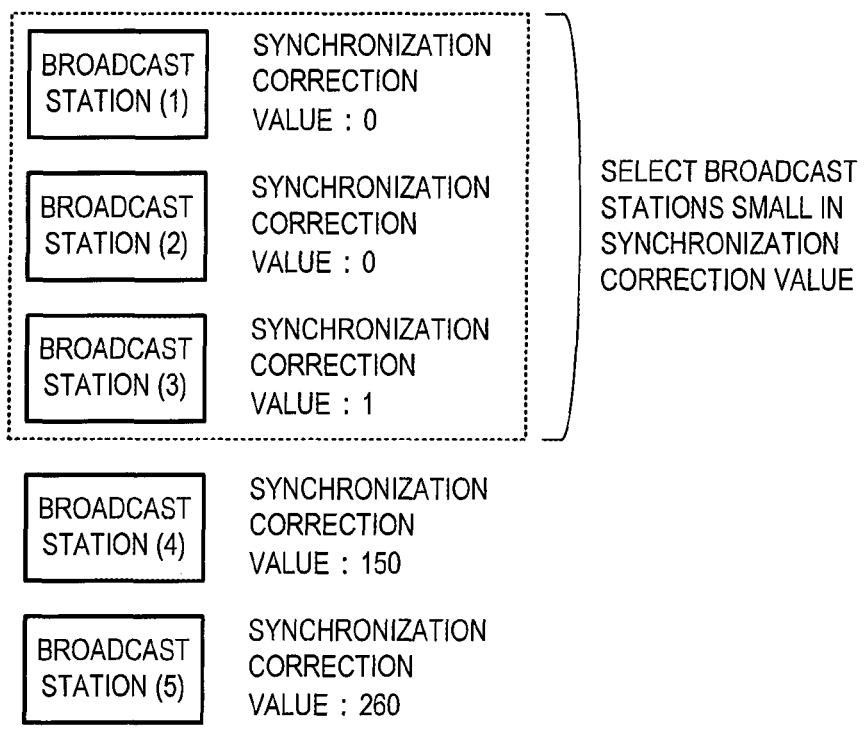
FIG. 6 is a schematic diagram illustrating a use selection example.

[Selection Example of Broadcast Stations to be Used: FIG. 6]

Referring next to FIG. 6, a selection example of broadcast stations (channels) to be used will be described. FIG. 6 is a schematic diagram illustrating a use selection example.

FIG. 6 is an example of sorting synchronization correction values for broadcast stations (broadcast station numbers) in ascending order to select channels of broadcast stations (1) to (3) small in synchronization correction value.

Note that the case where the synchronization correction value is zero (0) means that correction is unnecessary, i.e., that the system clock is synchronized with the GPS signal.

Figure 7:
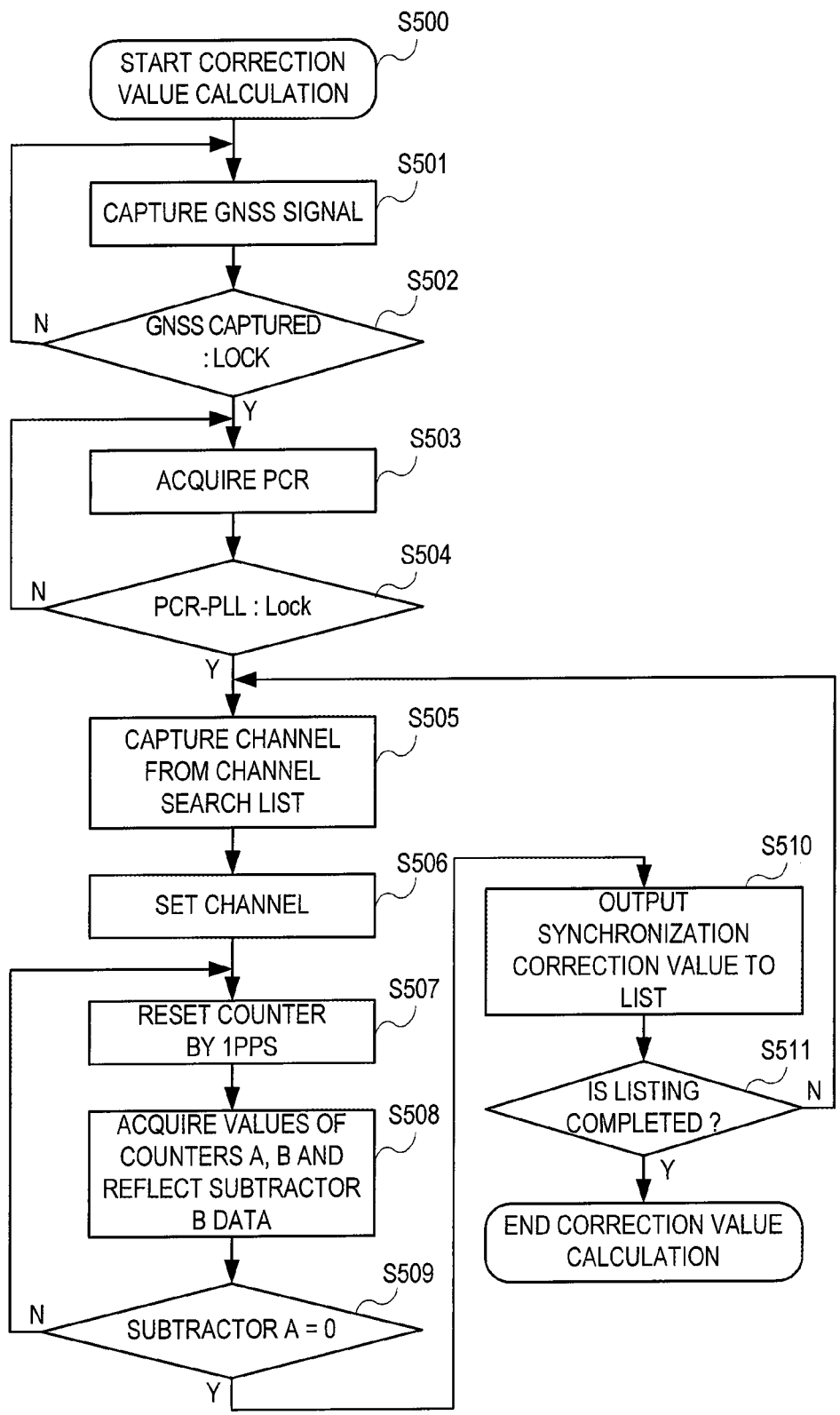
FIG. 7 is a flowchart illustrating processing for correction value calculation.

[Processing for Correction Value Calculation: FIG. 7]

Referring next to FIG. 7, processing for correction value calculation in the broadcast wave synchronization signal converting device 3 will be described. FIG. 7 is a flowchart illustrating processing for correction value calculation.

In the broadcast wave synchronization signal converting device 3, when processing for correction value calculation (S500) is started, a GNSS signal is first captured by the edge detector 18 and the frequency divider 20 (S501). The GNSS signal is composed of 1PPS of a GPS signal and a reproduction clock of 10 MHz.

Then, it is determined whether the GNSS signal is locked (captured) or not, i.e., whether the GNSS signal is valid as a stable signal or not (S502). When it cannot be locked (in the case of N), the procedure returns to processing S501. On the other hand, when it can be locked (in the case of Y), a channel is set for a valid broadcast station to acquire a PCR signal from broadcast wave reception data (S503).

It is then determined whether the PCR signal acquired for the valid broadcast station can be locked (PLL synchronized) or not (S504). When it cannot be locked (in the case of N), the procedure returns to processing S503. On the other hand, when it can be locked (in the case of Y), a channel is captured from the list (channel search list) obtained in the channel search processing of FIG. 5 (S505) to set the channel (S506).

Next, the counter (A) 19, the counter (B) 21, and the 25-bit counter 25 (see FIG. 3) used for correction calculation are reset at the timing of 1PPS (S507). Then, the count values of the counter (A) 19 and the counter (B) 21 are acquired at the subtractor (C1) 17, the count values are compared to acquire a difference as a correction value at the control amount adjustor 16, a synchronization correction value from the correction value is provided to the subtractor (B) 15, and the synchronization correction value (control amount) is subtracted from the PCR signal to set and reflect a corrected system time clock (counter value) in the 300-counter of the PCR counter 14 (S508).

Further, it is determined whether the value of the subtractor (A) becomes zero (0) or not (S509). When it does not become zero (in the case of N), the procedure returns to processing S507 to repeat the processing until the value becomes zero. On the other hand, when it becomes zero (in the case of Y), the synchronization correction value from the subtractor (B) 15 at the timing is output to the list in association with the channel number to list the synchronization correction value (S510).

Then, it is determined whether channel capturing from the channel search list is completed or not (S511). When listing is not completed (in the case of N), the procedure returns to processing S505, while when the channel search list is completed (in the case of Y), the processing for correction value calculation is ended.

Figure 8:
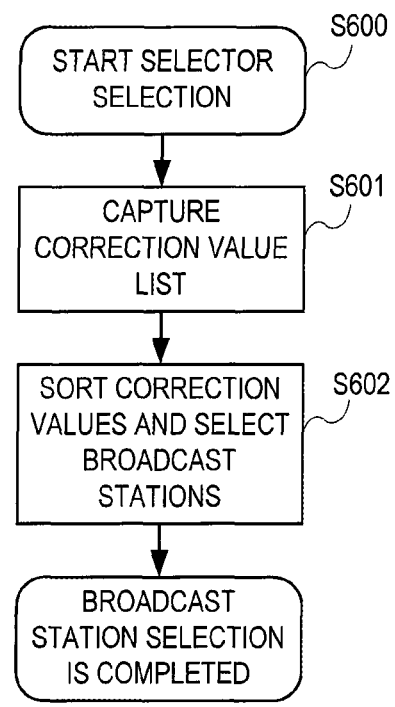
FIG. 8 is a flowchart of selector processing.

[Selector Processing: FIG. 8]

Referring next to FIG. 8, selector processing in the broadcast wave synchronization signal converting device 3 will be described. FIG. 8 is a flowchart of selector processing.

As illustrated in FIG. 8, the broadcast wave synchronization signal converting device 3 starts the selection of broadcast stations by the selector in the control amount adjustor 16 (S600).

The control amount adjustor 16 performs processing for capturing the correction value list created in FIG. 7 (S601), sorting the synchronization correction values in ascending order from the smallest, and selecting broadcast stations small in synchronization correction value (S602).

The broadcast stations sorted in ascending order of synchronization correction values are as illustrated in FIG. 6.

Thus, the broadcast station setting processing is completed.

Figure 9:
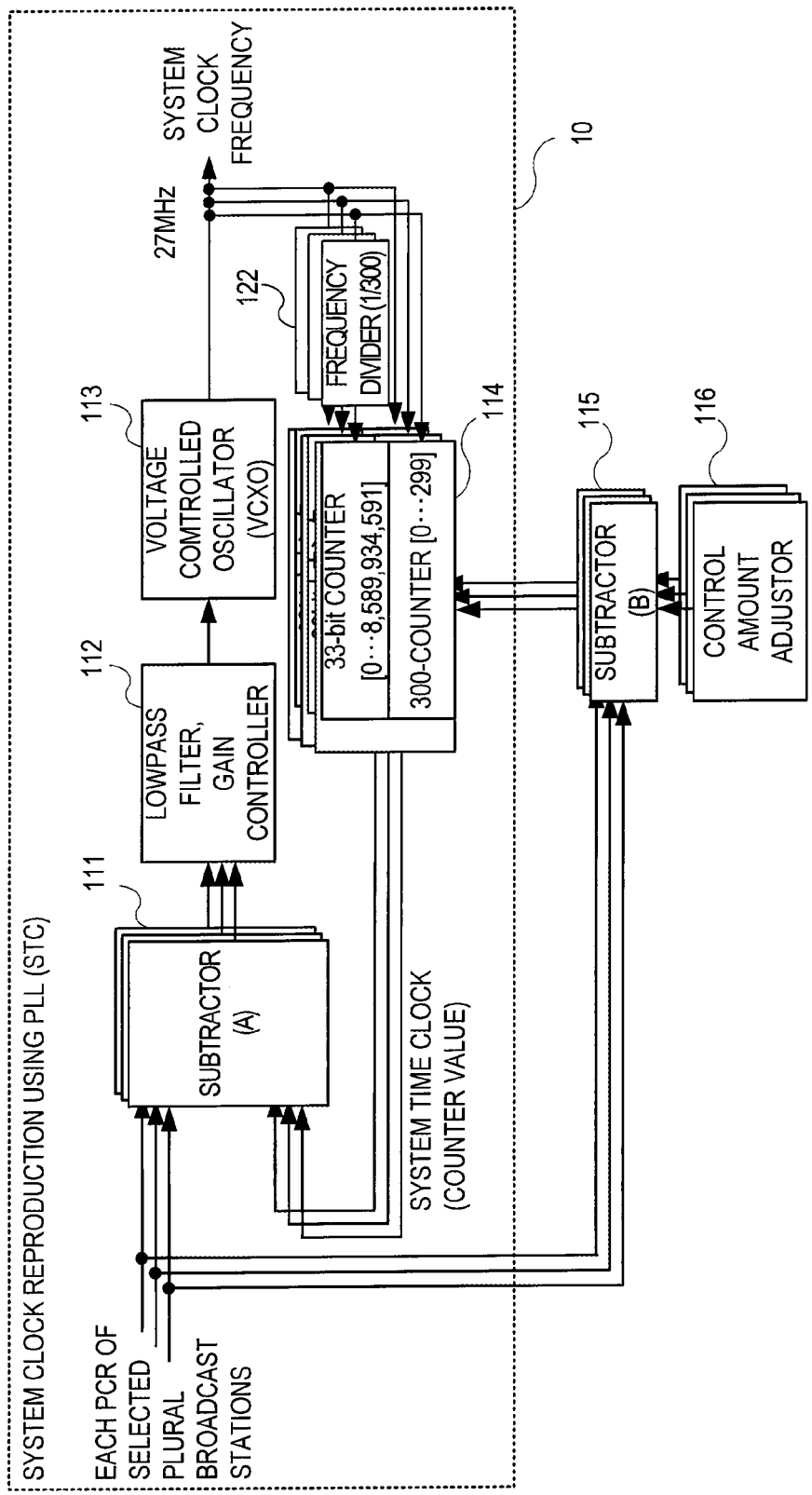
FIG. 9 is a configuration block diagram during operation.

[Configuration During Operation: FIG. 9]

Referring next to FIG. 9, a configuration during operation of the broadcast wave synchronization signal converting device 3 will be described. FIG. 9 is a configuration block diagram during operation.

FIG. 9 illustrates a case where plural broadcast stations (upper three stations) small in correction value are selected at the same time. In this case, since a correction value list is created in the control amount adjustor 116 and stored in the memory, the circuit section for correcting synchronization with the GNSS signal is omitted.

The configuration during operation has plural subtractors (A) 111, plural PCR counters 114, plural subtractors (B) 115, plural control amount adjustors 116, and plural frequency dividers 122 corresponding in number to the plural broadcast stations (here, three stations) selected at the same time, and has a common lowpass filter, gain controller 112 and a common voltage controlled oscillator (VCXO) 113.

Then, the lowpass filter, gain controller 112 determines whether output from each subtractor (A) 111 falls within a predetermined effective range. When the output changes abruptly to fall out of the effective range, the input signal is masked and invalidated, average processing within the effective range is performed on the output from the plural subtractors (A) 111, and the averaged value is output to the voltage controlled oscillator 113 to control the oscillation frequency of the voltage controlled oscillator 113.

The operation is continued even when all the broadcast stations are masked. Then, when there is any broadcast station masked for a long time, the broadcast station is once invalidated at a specified time and the selection of broadcast stations are made by the selector again.

In other words, the control amount adjustor 116 at which the invalidated broadcast station is selected makes a channel setting of a broadcast station unselected from the correction value list and small in correction value as a candidate to make a synchronization correction using the correction value in order to carry out the operation flow.

Figure 10:
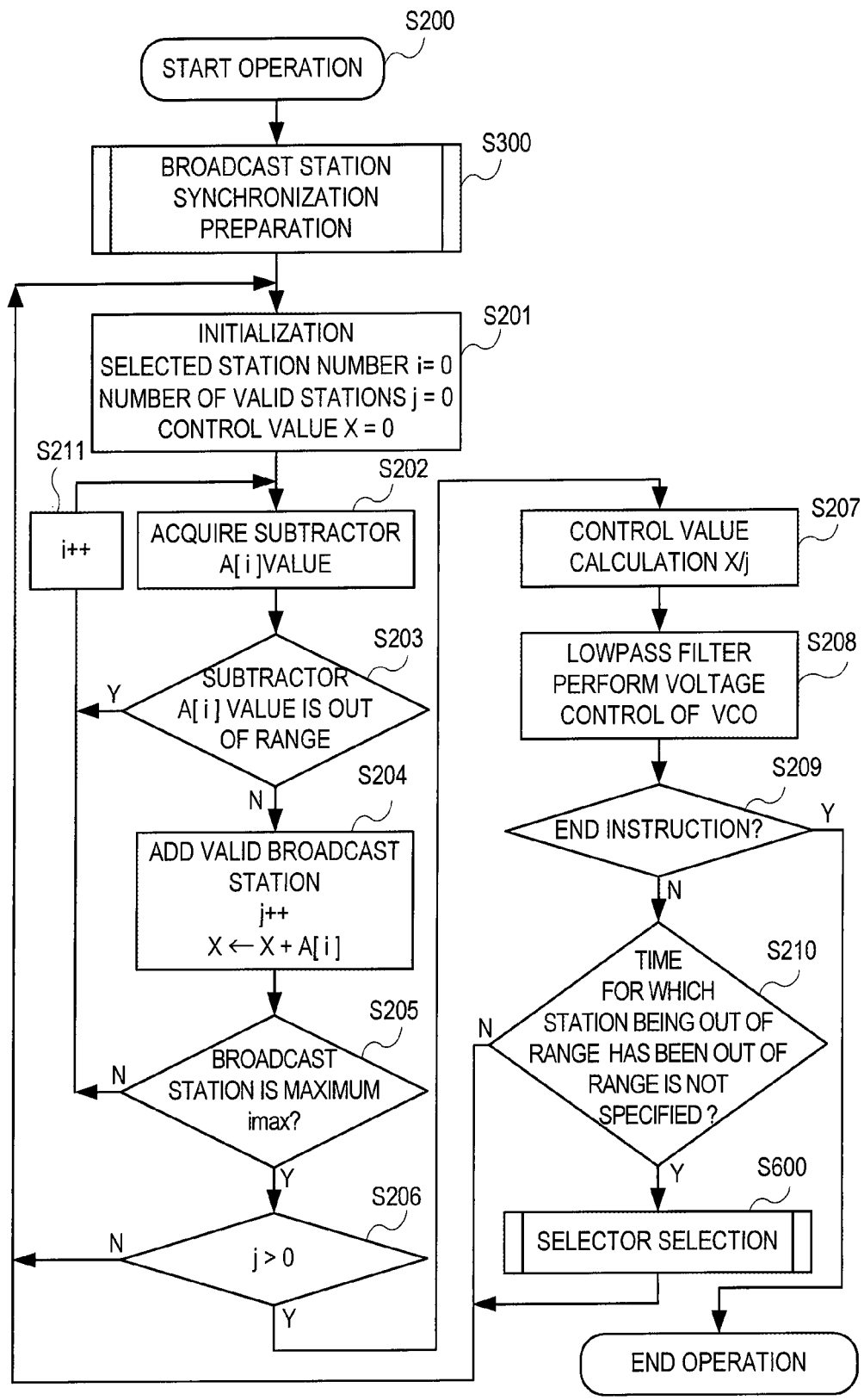
FIG. 10 is a flowchart illustrating processing during operation.

[Processing During Operation: FIG. 10]

Referring next to FIG. 10, processing during operation will be described. FIG. 10 is a flowchart illustrating processing during operation.

When the operation is started (S200), processing for broadcast station synchronization preparation illustrated in FIG. 4 is performed (S300). In the configuration of FIG. 9, synchronization preparation processing is already performed and the circuit for synchronization correction is omitted. When the synchronization preparation processing is already performed, processing S300 can be skipped.

As initialization processing during operation, selected station number i=0, number of valid stations j=0, and control value X=0 are set (S201). Here, the control value X means the synchronization correction value.

Then, a value of the subtractor (A) 111 for the selected station number i (subtractor A[i] value) is acquired (S202) to determine whether the subtractor A[i] value is out of the predetermined effective range or not (S203).

When it is out of the effective range (in the case of Y), the selected station number i is incremented (S211), and the procedure returns to processing S202. This increment processing is processing for masking the subtractor A[i] value being out of the effective range.

On the other hand, when it is not out of the effective range (in the case of N), the number of valid stations (number of valid stations j) is incremented to add the subtractor A[i] value to the control value X so as to create a new control value X (S204).

Next, it is determined whether the broadcast station is the maximum or not, that is, whether the selected station number i is the maximum or not (S205). When the selected station number i is not the maximum (in the case of N), the procedure proceeds to processing S211 to return to processing S202. On the other hand, when the selected station number i is the maximum (in the case of Y), it is then determined whether the number of valid stations, j, is larger than zero (0) or not (S206). When the number of valid stations, j, is not larger than zero (in the case of N), it is held and the procedure returns to processing S201. The case where the number of valid stations, j, is not larger than zero means that any valid station is not obtained.

On the other hand, when the number of valid stations, j, is larger than zero (in the case of Y), processing for averaging the control value X by the number of valid stations, j, is performed, that is, control value calculation processing for control value averaging (X/j) is performed (S207).

In other words, as described above, the lowpass filter, gain controller 112 performs voltage control of the voltage controlled oscillator 113 by masking values outside the effective range or averaging values by the number of valid stations, j, within the effective range (S208).

Next, it is determined whether there is an end instruction or not (S209). When there is the end instruction (in the case of Y), the operation is ended, while when there is no end instruction (in the case of N), it is then determined whether the time for which the broadcast station being out of the range has been out of the range is not specified, that is, whether the time for which the masked broadcast station has been masked is longer than a specific time or not (S210).

As already described, the lowpass filter, gain controller 112 has the clock function to measure the masking time.

When the time for which the masked broadcast station has been masked is not longer than the specific time (in the case of N), the procedure returns to processing S201. On the other hand, when the time for which the masked broadcast station has been masked is longer than the specific time (in the case of Y), selection processing by the selector (S600) illustrated in FIG. 8 is performed, and then the procedure returns to processing S201.

Effects of Embodiment

According to the first conversion device or the second conversion device, the broadcast wave synchronization signal converting device is configured such that the PLL circuit 10 reproduces a system clock based on time information acquired from received broadcast waves, and the synchronization correction unit corrects the acquired time information to be synchronized with a GNSS signal, wherein the synchronization correction unit has: the subtractor (C1) 17 which subtracts, from a counter value corresponding to a periodic signal interval of the GNSS signal, a counter value of the system clock counted in the signal interval to output a difference value; the control amount adjustor 16 which calculates, as a correction value, the control amount of synchronization based on the difference value; and the subtractor (B) 15 which subtracts the correction value from the acquired time information to set corrected time information to internal time information in the PCR counter 14 of the phase synchronization unit. Thus, the embodiment has the effect of synchronizing the broadcast waves with the GNSS signal on the reception side, and making a correction to fit a world standard time by the correction value to enable periodic calibration of the frequency.

According to the first/second conversion device, since the periodic calibration is performed in a short period, the embodiment has the effect of making the frequency deviation small and eliminating broadcast stations incapable of being synchronized with the UTC time.

Further, according to the first/second conversion device, even when data cannot be acquired suddenly due to broadcast suspension, the embodiment has the effect of preventing the time from being largely off after broadcasting is resumed.

Further, according to the first/second conversion device, the embodiment has the effect of preventing the time reference value from deviating largely even by switching between broadcasting system 1 and system 2, and between broadcast stations.

INDUSTRIAL APPLICABILITY

The present invention is suitable for a broadcast wave synchronization signal converting device configured to synchronize broadcast waves with a GNSS signal on a receiver side and makes a correction to fit the UTC world standard time by a correction value to perform periodic calibration of the frequency.

DESCRIPTION OF REFERENCE NUMERALS

1 . . . broadcast wave antenna, 2 . . . broadcast wave receiving unit, 3 . . . broadcast wave synchronization signal converting device, 10 . . . PLL circuit, 11 . . . subtractor (A), 12 . . . lowpass filter, gain controller, 13 . . . voltage controlled oscillator (VCXO), 14 . . . PCR counter, 15 . . . subtractor (B), 16 . . . control amount adjustor, 17 . . . subtractor (C1), 18 . . . edge detector, 19 . . . counter(A), 20 . . . frequency divider, 21 . . . counter (B), 22 . . . frequency divider, 23 . . . frequency divider, 24 . . . edge detector, 25 . . . 25-bit counter, 26 . . . subtractor (C2), 111 . . . plural subtractors (A), 112 . . . common lowpass filter, gain controller, 113 . . . common voltage controlled oscillator (VCXO), 114 . . . plural PCR counters, 115 . . . plural subtractors (B), 116 . . . plural control amount adjustors, 122 . . . plural frequency dividers

The invention claimed is:

1. A broadcast wave synchronization signal converting device configured to synchronize time information, acquired from received broadcast waves, with a Global Navigation Satellite System (GNSS) signal and set the synchronized time information to internal time information, comprising:
   a phase synchronization unit configured to reproduce a system clock based on the acquired time information; and
   a synchronization correction unit configured to correct the acquired time information to be synchronized with the GNSS signal,
   wherein the synchronization correction unit has:
   a subtractor which subtracts, from a counter value corresponding to a periodic signal interval of the GNSS signal, a counter value of the system clock counted in the signal interval and outputs a difference value;
   a control amount adjustor which calculates, as a correction value, a control amount of synchronization based on the difference value;
   a setting unit which subtracts the correction value from the acquired time information and sets corrected time information to the internal time information in the phase synchronization unit;
   an edge detector which detects a 1PPS edge of a Global Positioning System (GPS) signal;
   a first frequency divider which frequency-divides a reproduction clock of the GPS signal;
   a second frequency divider which frequency-divides the system clock;
   a first counter which counts a clock from the first frequency divider and outputs, to the subtractor, a counter value by using an edge detection signal from the edge detector; and
   a second counter which counts a clock from the second frequency divider and outputs, to the subtractor, a counter value by using the edge detection signal from the edge detector, and
   wherein the clock output from the first frequency divider is the same in frequency as the clock output from the second frequency divider.

2. The broadcast wave synchronization signal converting device according to claim 1, wherein the control amount adjustor calculates correction values for a plurality of channels, creates a list in which information on the channels is associated with the correction values, and selects a channel small in correction value from the list.

3. The broadcast wave synchronization signal converting device according to claim 1, wherein when a difference value between the acquired time information and the internal time information falls out of a specific range, the phase synchronization unit invalidates and masks the difference value.

4. A broadcast wave synchronization signal converting device configured to synchronize time information, acquired from received broadcast waves, with a Global Navigation Satellite System (GNSS) signal and set the synchronized time information to internal time information, comprising:
   a phase synchronization unit configured to reproduce a system clock based on the acquired time information; and
   a synchronization correction unit configured to correct the acquired time information to be synchronized with the GNSS signal,
   wherein the synchronization correction unit has:
   a subtractor which subtracts, from a counter value corresponding to a periodic signal interval of the GNSS signal, a counter value of the system clock counted in the signal interval and outputs a difference value;
   a control amount adjustor which calculates, as a correction value, a control amount of synchronization based on the difference value;
   a setting unit which subtracts the correction value from the acquired time information and sets corrected time information to the internal time information in the phase synchronization unit;
   an edge detector which detects a 1PPS edge of a Global Positioning System (GPS) signal; and
   a counter which counts the system clock and outputs, to the subtractor, a counter value by using an edge detection signal from the edge detector, and
   wherein the subtractor receives input of the edge detection signal from the edge detector and holds a counter value in an interval of 1PPS of the GPS signal, and subtracts the counter value of the counter from the held counter value and outputs a difference value by using the edge detection signal.

5. The broadcast wave synchronization signal converting device according to claim 4, wherein the control amount adjustor calculates correction values for a plurality of channels, creates a list in which information on the channels is associated with the correction values, and selects a channel small in correction value from the list.

6. The broadcast wave synchronization signal converting device according to claim 4, wherein when a difference value between the acquired time information and the internal time information falls out of a specific range, the phase synchronization unit invalidates and masks the difference value.

* * * * *